United States Patent Office

2,883,355
Patented Apr. 21, 1959

2,883,355

AQUEOUS PIGMENTED DISPERSION CONTAINING A BUTADIENE-METHYL METHACRYLATE COPOLYMER

Bernard James Balfe, Stowmarket, and Peter George Edgerley, Stevenage, England, assignors to Imperial Chemical Industries Limited, London, England, a corporation of Great Britain No Drawing. Application October 4, 1954
Serial No. 460,268

Claims priority, application Great Britain
October 21, 1953

6 Claims. (Cl. 260—29.7)

This invention relates to aqueous dispersions especially suitable for use in coating compositions and to paints containing the dispersions.

According to the present invention we provide a pigmented disperson having a continuous aqueous phase, at least one dispersed pigment and a dispersed copolymer of butadiene-1,3 and methyl methacrylate, the weight of copolymerised methyl methacrylate units in the copolymer being from 55 to 75% by weight of the copolymer.

These dispersions, when spread as films, form strong, tenacious coatings and are thus valuable as a basis for coating compositions, particularly water-paints for indoor use, and paper or leather coating compositions. In water-paint compositions they have very good brushing properties, and form coatings which may be varied from matte to semi-glossy. These coatings dry very rapidly and even under conditions of low temperature and relatively high humidity a second coat can, if desired, be applied on the first after a period of two hours. After the applied film is thoroughly dry, the film is highly resistant to scrubbing. We find that for this purpose the copolymers have the requisite balance of hardness, elasticity and adhesiveness. If relatively hard films are required a copolymer having a high proportion of methyl methacrylate within our range should be used. In general, optimum results are obtained when the copolymer contains from 60 and 70% by weight of copolymerised methyl methacrylate units.

The numerical average of the diameters of the copolymer particles in our dispersions are preferably greater than 0.05 micron, average particle diameter of 0.1 to 0.2 micron being particularly useful. Dispersions in which the numerical average of the diameters of the copolymer particles are greater than 0.05 micron have the advantage that they may have a high copolymer content e.g. 50% by weight of the dispersion or greater, and at the same time a relatively low viscosity and thus such dispersions of relatively high copolymer content are particularly easily spread on surfaces. High solids content dispersion coating compositions, which may be thinned with water for ease of spreading without unduly decreasing their solids content or their stability as dispersions, may also be compounded without difficulty. The numerical average of the diameters of the pigment particles in our dispersions is preferably not greater than 2.0 microns in order that coatings produced from them may have smooth surfaces.

Our copolymer dispersions may be prepared without difficulty by aqueous emulsion polymerisation. In this process the required monomers are dispersed in water in the presence of an emulsifying agent and a polymerisation catalyst system and the mixture is usually subjected to an elevated temperature while it is agitated sufficiently to obtain thermal control without causing coagulation. Suitable emulsifying agents are alkali metal salts of long chain fatty acids or of long chain sulphated or sulphonated fatty acids, e.g. sodium or potassium stearate, sodium or potassium lauryl sulphate and sodium or potassium cetyl sulphate. Dispersions of particularly good low viscosity/high solids content characteristics (i.e. of adequate average particle sizes) may be obtained by controlling the addition of the emulsifying agent in a manner such that at least part of the total amount of emulsifying agent added during the course of the polymerisation process is added after the initiation of the polymerisation reaction, as for example described in our copending applications numbered 6253/53 and 11,940/53. Copolymer dispersions of 50% solids content by weight with good mechanical properties and relatively low viscosities can be prepared in this way. Protective colloids, i.e. high molecular weight hydrophilic materials may also be incorporated in amounts of, for example, from 2% to 10% by weight of the copolymer, before or after polymerisation, to improve the stability of the dispersion. The protective colloids may be naturally occurring materials e.g. casein, gum arabic or starch, or they may be known synthetic high molecular compounds having dispersing properties e.g. the sodium sale of β-naphthalene sulphonic acid and formaldehyde condensed together in 2 to 1 molar ratio, or the condensate of dioctyl cresol and ethylene oxide. If naturally occurring protective colloids are used for this purpose in the coating compositions, it is often desirable also to incorporate a fungicide as, for example, sodium fluoride, sodium pentachlorphenate, lauryl pentachlorphenol, or sodium orthophenyl phenate, in an amount of, for example, from 0.1% to 1.0% based on the weight of the colloid.

Catalyst systems normally involve both one or more polymerisation activators and one or more compounds which promote and control polymerisation. Suitable polymerisation activators are hydrogen peroxide and water soluble persulphates, as, for example, potassium or ammonium persulphate. Suitable compounds which promote and control polymerisation are aliphatic mercaptans containing at least six carbon atoms, e.g. isohexyl mercaptan, octadecyl mercaptan, n-dodecyl mercaptan and tertiary dodecyl mercaptan; dialkyl polysulphides, e.g. di(sec. butyl) disulphide; nitro diaryl polysulphides, e.g. di-ortho dinitro phenyl disulphide, and dialkyl xanthogen disulphides, e.g. diisopropylxanthogen disulphide. The amount of the latter compounds used is normally from 0.05 to 1% by weight of the monomers.

Anti-foaming agents may usefully be added to the polymerisation mixture at the end of the polymerisation process to prevent foaming if it is necessary to remove the residual monomers at the end of the process. Their presence in the copolymer dispersion is also useful in preventing foaming both in the manufacture of the paint composition and in its use. Known anti-foaming compounds may be used for this purpose, e.g. glyceryl monoricinoleate, or silicone anti-foaming compounds, useful amounts being from 0.1% to 2% by weight based on the weight of the dispersion.

Pigments well suited for dispersion in the emulsions include anatase and rutile titanium dioxide, lithopone, ochre, iron oxide, sienna and the phthalocyanine pigments. The pigmented compositions may be extended by, for example, china clay, barytes, blanc fixe and Paris white. To obtain the best results from the use of the hereinbefore described copolymers as binders for pigments, the amount of pigment incorporated is, in general, of the same order as the amount which would be used with conventional film forming media, from about 1.0 part to 4.0 parts by volume of copolymer to each part by volume of pigment including the volume of any pigment extender being the preferred range. A sequestering agent, e.g. sodium pyrophosphate, or sodium hexametaphosphate with a high degree of polymerisation, is usefully included to assist in the dispersion of the pigment or pigments, there being for example from 0.1% to 2.0% of the sequestrant based on the weight of the pigment including the weight of any pigment extender.

When our dispersions are used in paper coating, some part of the copolymer may be replaced by a sizing agent normally used in such applications e.g. casein, glue, alpha protein, soya flour or starch; useful amounts of the sizing agent are from 0.1 part to 3 parts by weight per part by weight of copolymer.

We prefer to adjust the pH of the copolymer dispersion so that it is slightly alkaline, e.g. 7 to 10, since in forming a paint composition some of the additives are themselves alkaline and tend to coagulate the dispersion if it is slghtly acid. The adjustment of the pH may be effected by the use of suitable bases during polymerisation or at the end of polymerisatiton by the addition of, for example, ammonia or amines.

The dispersions of our invention may also be usefully blended with other polymer or copolymer dispersions particularly dispersions of harder polymers or copolymers, e.g. a copolymer of butadiene-1,3 and methyl methacrylate containing more than 80 parts by weight of copolymerised methyl methacrylate units, since such blends give tougher films. Thus, a dispersion in water of a copolymer of 55 parts by weight copolymerised methyl methacrylate units and 45 parts by weight copolymerised butadiene-1,3 units may be blended in equal proportions with a dispersion in water of a copolymer of 85 parts by weight copolymerised methyl methacrylate units and 15 parts by weight of copolymerised butadiene-1,3 units to provide a basis for coating compositions.

Our invention is more particularly illustrated, though in no way limited, by the following examples in which all parts are by weight.

EXAMPLE I

*Preparation of copolymer*

35 parts butadiene
65 parts methyl methacrylate
0.2 part lauryl mercaptan
0.2 part potassium persulphate
0.1 part sodium salt of β-naphthalene sulphonic acid/formaldehyde condensed together in 2 to 1 molar ratio
0.25 part sodium lauryl sulphate
90 parts distilled water These ingredients, except the butadiene, were placed in a stainless-steel stirred reaction vessel of a working capacity of 20 gallons. The autoclave was then sealed down, purged thrice with nitrogen to 80 p.s.i. and then evacuated to about 6″ Hg. The butadiene was added and the vessel was raised to and maintained at 50° C. At 45% conversion (5 hours) a further 1 part of sodium lauryl sulphate (in aqueous solution) was added; this procedure was repeated after a further 3 hours (65% conversion). At the end the concentration of emulsifier had thus been raised to 2.25 parts and the water to 96 parts. When the monomer-to-polymer conversion had reached 95% (18 hours in all), the residual butadiene was blown off and the reaction stopped. The resultant latex was of low viscosity and contained about 50% solids.

*Preparation and application of paint dispersion*

25.5 parts of rutiox titanium dioxide pigment were ground in an edge runner mill for 1½ hours with 2.0 parts of a 10% solution of sodium pyrophosphate and sufficient of an aqueous casein solution to give a stiff grind. Further casein solution was then added so that the total amount of solution added was 25.5 parts. To this mill base was added 2.0 parts of glyceryl monoricinoleate and the pH was adjusted to 9 with concentrated ammonia solution before adding 39.0 parts of the butadiene-methyl methylacrylate copolymer dispersion also adjusted to pH 9 and 0.5 part of sodium silicate dissolved in 6.0 parts of water. The casein solution used contained 14.0% of solid casein solubilised by borax and preserved by sodium fluoride. The resultant white paint on thinning with 25% of water showed good brush stability and on brushing out on various surfaces dried rapidly to a slightly glossy film having a very uniform texture. After two hours at 40° F. and 80% relative humidity a second coat could be applied.

EXAMPLE II

The white paint of Example I produced various shades of pink on admixture with the following tinter.

| | Parts |
|---|---|
| "Monolite" (registered trademark), Fast Scarlet RNS pigment | 7.5 |
| China clay | 11.5 |
| Paris white | 1.7 |
| 14% by weight aqueous casein solution | 18.5 |
| Condensate of dioctyl cresol and ethylene oxide (30% by weight aqueous solution) | 3.0 |
| Water | 13.3 |
| Copolymer dispersion of Example I | 44.5 |
| | 100.0 |

The tinter was prepared by grinding all the ingredients except the copolymer dispersion in an edge runner mill for 2 hours and then incorporating the copolymer dispersion by simple mixing.

EXAMPLE III

A ferrite yellow tinter which was used to tint the white paint of Example I was prepared from the following ingredients using the technique of Example II.

| | Parts |
|---|---|
| Yellow Oxide 5GS | 10.0 |
| China clay | 10.0 |
| Paris white | 0.5 |
| 14% by weight aqueous casein solution | 18.5 |
| 10% sodium pyrophosphate solution | 2.0 |
| Condensate of dioctyl cresol and ethylene oxide (30% by weight aqueous solution) | 3.0 |
| Water | 17.0 |
| Copolymer dispersion of Example I | 39.0 |
| | 100.0 |

EXAMPLE IV

A blue paint was made from the following ingredients:

| | Parts |
|---|---|
| Monastral Blue LBS (registered trademark) | 8.00 |
| Rutiox titanium dioxide | 0.35 |
| Paris white | 1.70 |
| China clay | 12.20 |
| 14% by weight aqueous casein solution | 18.50 |
| Condensate of dioctyl cesol and ethylene oxide (30% by weight aqueous solution) | 3.00 |
| 10% aqueous sodium pyrophosphate solution | 2.00 |
| Water | 15.25 |
| Copolymer dispersion of Example I | 39.00 |
| | 100.00 |

The pigment and pigment extenders were ground in an edge runner mill for 1½ hours with the sodium pyrophosphate soution and sufficient of the casein solution was added to give a stiff grind. The remainder of the casein solution was then added together with the remaining ingredients, the copolymer dispersion being added last after adjustment to pH 9.

EXAMPLE V

A yellow paint was prepared from the following ingredients:

| | Parts |
|---|---|
| Cadmium sulphide | 12.5 |
| China clay | 7.5 |
| Paris white | 1.7 |
| 14% by weight aqueous casein solution | 18.5 |
| Condensate of dioctyl cresol and ethylene oxide (30% by weight aqueous solution) | 3.0 |
| 10% aqueous sodium pyrophosphate solution | 2.0 |
| Water | 15.8 |
| Copolymer dispersion of Example I | 39.0 |
| | 100.0 |

The paint was compounded as in Example IV.

EXAMPLE VI

A yellow paint was prepared from the following ingredients:

| | Parts |
|---|---|
| Monolite Yellow 10GS (registered trademark) | 8.5 |
| China clay | 10.7 |
| Paris white | 1.7 |
| 14% by weight aqueous casein solution | 18.5 |
| Condensate of dioctyl cresol and ethylene oxide (30% by weight aqueous solution) | 3.0 |
| 10% aqueous sodium pyrophosphate solution | 2.0 |
| Water | 16.6 |
| Copolymer of Example I | 39.0 |
| | 100.0 |

The paint was compounded as in Example IV.

We claim:

1. A pigmented dispersion having a continuous aqueous phase, at least one dispersed pigment and a dispersed copolymer of butadiene-1,3 and methyl methacrylate the weight of copolymerised methyl methacrylate units in the copolymer being from 60 to 70% by weight of the copolymer and the ratio of copolymeric material to pigment being from 1.0 parts to 4.0 parts by volume of copolymer to each part by volume of pigment including any pigment extender.

2. A pigmented dispersion according to claim 1 which comprises in addition a copolymer of butadiene-1,3 and methyl methacrylate in which the weight of polymerised methyl methacrylate units is at least 80% of the weight of the copolymer.

3. A pigmented dispersion according to claim 1 in which the numerical average size of the diameters of the copolymer particles is greater than 0.05 micron.

4. A pigmented dispersion according to claim 3 in which the numerical average size of the diameters of the copolymer particles is from 0.1 to 0.2 micron.

5. A pigmented dispersion according to claim 1 in which the numerical average of the diameters of the pigment particles is not greater than 2.0 microns.

6. A pigmented dispersion having a continuous aqueous phase, at least one dispersed pigment and a dispersed copolymer of butadiene-1,3 and methyl methacrylate, the weight of copolymerised methyl methacrylate units in the copolymer being from 60 to 70% by weight of the copolymer.

References Cited in the file of this patent

UNITED STATES PATENTS

| | | |
|---|---|---|
| 2,232,515 | Arnold et al. | Feb. 18, 1941 |
| 2,579,908 | Davison et al. | Dec. 25, 1951 |
| 2,605,242 | Betts et al. | July 29, 1952 |
| 2,676,930 | McKay et al. | Apr. 27, 1954 |
| 2,686,766 | Silverstein et al. | Aug. 17, 1954 |